H. F. PERKINS.
FRACTIONATING APPARATUS.
APPLICATION FILED DEC. 23, 1918.

1,386,020.

Patented Aug. 2, 1921.
2 SHEETS—SHEET 1.

WITNESSES
J. Herbert Bradley.
Maurice J. Tomasson.

INVENTOR
Harry F. Perkins
by Christy & Christy
attys.

H. F. PERKINS.
FRACTIONATING APPARATUS.
APPLICATION FILED DEC. 23, 1918.

1,386,020.

Patented Aug. 2, 1921.
2 SHEETS—SHEET 2.

WITNESSES
J. Herbert Bradley.
Francis J. Tomasson

INVENTOR
Harry F. Perkins
by Christy & Christy
Attys.

UNITED STATES PATENT OFFICE.

HARRY F. PERKINS, OF PITTSBURGH, PENNSYLVANIA, ASSIGNOR TO ROSANOFF PROCESS COMPANY, OF PITTSBURGH, PENNSYLVANIA, A CORPORATION OF DELAWARE.

FRACTIONATING APPARATUS.

1,386,020.     Specification of Letters Patent.     Patented Aug. 2, 1921.

Application filed December 23, 1913. Serial No. 267,885.

*To all whom it may concern:*

Be it known that I, HARRY F. PERKINS, residing at Pittsburgh, in the county of Allegheny and State of Pennsylvania, a citizen of the United States, have invented or discovered certain new and useful Improvements in Fractionating Apparatus, of which improvements the following is a specification.

In Letters Patent of the United States No. 1,171,464, dated February 15th, 1916, there is set forth, in connection with suitable instrumentalities, a process of fractionation of mixtures of fluid substances, wherein the vapors to be fractionated are caused to flow through a course or series of zones which are individually maintained each at a constant temperature, the temperatures of the successive zones being progressively lower from the initial zone to the final zone of the course of the vapors. A portion of the vapors may be condensed in each successive zone, and the condensate is caused to flow back into the preceding zone or zones of higher temperature, wherein it will be redistilled, and the resulting vapors will again flow forwardly in the course, so that in the normal operation described, there is maintained in the course a forward flow of vapor and a backward flow of condensate. The temperatures to be maintained in the successive zones may be predetermined according to rules laid down in the said Letters Patent, and the operation may be so conducted as to obtain continuously from the raw mixture a product of desired composition, which may, if desired, be condensed into liquid form.

It is the primary object of the present invention to provide an improved fractionating apparatus which is particularly well adapted for the practice of the process of the said Letters Patent, although it will be understood that it may be employed, in whole or in part, for any fractionating operation in connection with which it is capable of use.

Figure 1:
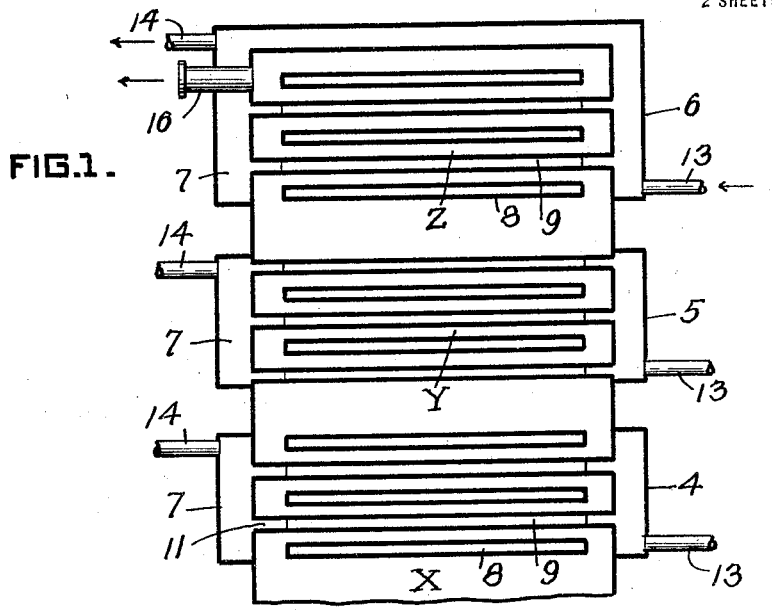
Figure 2:
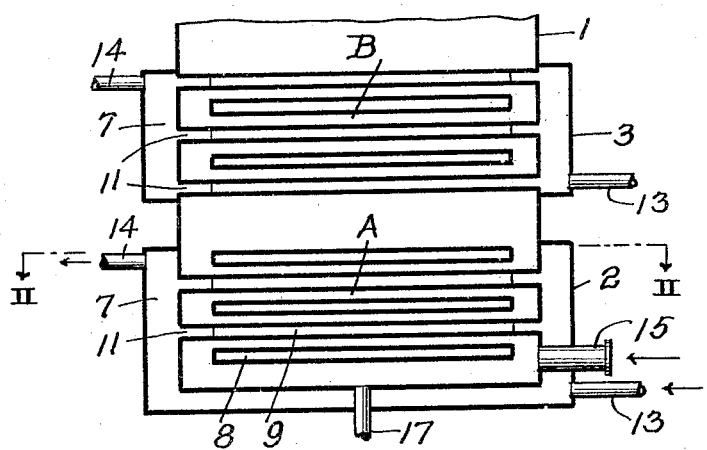
Figure 2:
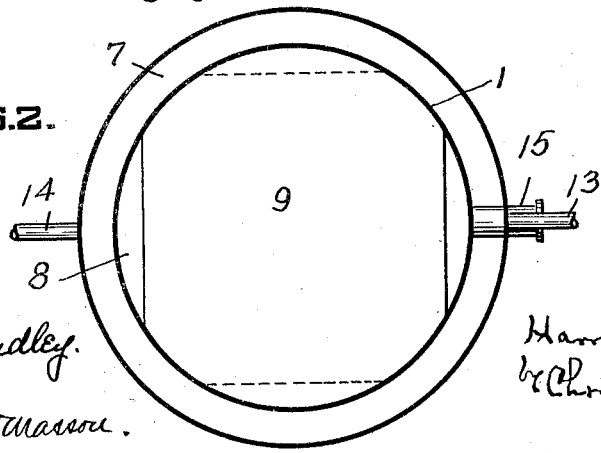
Figure 3:
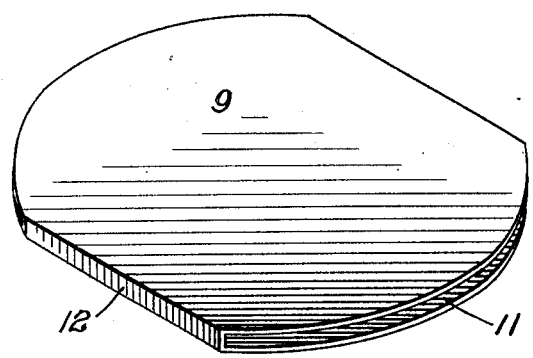
Figure 4:
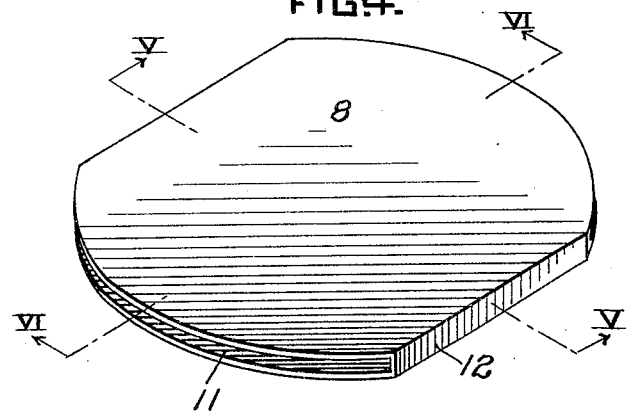
Figure 5:
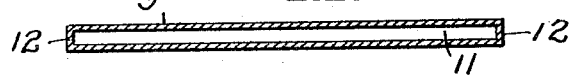
Figure 6:
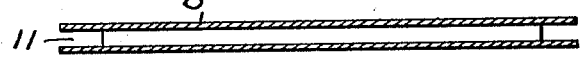

In the accompanying drawings, Figure 1 is a view in sectional elevation of the bottom portion and the top portion of a fractionating column or tower embodying the invention in its preferred form. Fig. 2 is a cross-sectional plan view on the line II—II of Fig. 1. Figs. 3 and 4 are views in perspective, on a larger scale, of two adjacent intra-tower conduits for temperature-controlling fluid in their relative arrangement as shown in Fig. 1, but spaced somewhat farther from each other than is therein indicated. Figs. 5 and 6 are sectional elevations of one of the said conduits, taken respectively on the lines V—V and VI—VI of Fig. 4.

The tower 1 is shown as a unitary structure closed at the bottom and the top, and may be conveniently made of boiler-plates. It is shown as circular in cross-section, but it may of course be rectangular or of other desired form. The tower is provided at the bottom and the top, and at intervals between, with closed, hollow, encircling casing-members 2, 3, 4, 5, 6, which in conjunction with the wall of the tower form annular chambers 7 for temperature-controlling fluid, and define the successive zones A, B—X, Y, Z, of constant temperature hereinbefore mentioned. The casing-member 2 is preferably so formed as to inclose the bottom surface of the tower, and the casing-member 6 to inclose the top surface of the tower, as shown in Fig. 1.

Opening through the wall of the tower and into each of the chambers 7 are the diametrical intra-tower conduits 8, 9, to conduct the temperature-controlling fluid across the path of the vapors up through the tower. These conduits may be of any desired form and relative arrangement, but they are preferably of the form shown, being flat, shallow, hollow boxes, having open segmental ends 11 to fit into segmental slits provided for them in the tower wall, and closed cut-away sides 12, to permit passage between them and the tower-wall of the vapors under treatment. The successive conduits are also preferably arranged at right-angles relatively to each other, as particularly shown in Figs. 3 and 4 taken together. The conduits are thus made to serve as hollow baffles, to cause the vapors flowing up through the tower to follow tortuous paths, and thus be the more effectively subjected to the desired thermal conditions. Any other relatively angular arrangement of the conduits can of course be made to attain more or less perfectly the same desirable effect.

Each of the chambers 7 is provided at the bottom with an inlet 13 for the temperature-controlling fluid, and at the top with an outlet 14.

The vapors to be fractionated flow from a still (not shown) or other source of supply, and enter the tower at the bottom through the inlet 15. Thence they flow upwardly through the tower, being subjected to gradually reduced temperatures in the successive constant temperature zones, leaving behind the condensates as formed, which fall back downwardly and may again, in whole or in part, be reconverted into vapor, until there emerges through the outlet 16 at the top of the tower the final vapor product of the desired composition, which may be conducted to a condenser (not shown) or other point of disposal. The residue condensates may be drawn off from the bottom of the tower through the pipe 17.

The operation of the apparatus will be apparent from the drawings and the foregoing description, and it will also be evident that constructional variations may be made without departure from the invention. Full opportunity is given for very nice and accurate regulation of the temperature in the successive zones, and the maintenance of such constant temperatures. The desired fractionation can thus be obtained on a commercial scale with accuracy and with regularity of operation.

I claim as my invention.

1. A structure of the character and for the purposes described, containing in combination, a fractionating chamber having an inlet opening at one end for the substances to be treated and an outlet opening at its opposite end, a chamber for temperature-controlling fluid surrounding said fractionating chamber between its ends and provided with inlet and outlet openings, and a plurality of flat hollow plates extending transversely thereof, each of said plates having closed side-walls spaced from the inner wall of said fractionating chamber, and opposite open ends connected to said fluid chamber, said plates being arranged in transverse lines in angular relation one to the other, whereby the substances under treatment are caused to flow in a tortuous path.

2. A structure of the character and for the purposes described, containing in combination, a vertical fractionating tower having an inlet opening at its bottom and a discharge opening at its top, a series of independent chambers for temperature-controlling fluid surrounding said tower, and conduits connected at their opposite ends to said fluid-chambers and passing transversely through the tower in the path of flow of the substances under treatment.

3. A structure of the character and for the purposes described, containing in combination, a vertical fractionating tower having an inlet opening at its bottom and a discharge opening at its top, a series of independent chambers for temperature-controlling fluid surrounding said tower, and a plurality of flat hollow plates passing transversely across said tower in angular relation one to the other, said plates having open ends connected to said fluid chambers and closed side edges spaced away from the tower walls, whereby the substances under treatment are caused to flow through said tower in a tortuous path.

In testimony whereof I have hereunto set my hand.

HARRY F. PERKINS.

Witnesses:
MARSHALL A. CHRISTY,
FRANCIS J. TOMASSON.